United States Patent
Harrison

[19]

[11] Patent Number: 5,927,008
[45] Date of Patent: Jul. 27, 1999

[54] PLANT GROWING

[76] Inventor: Samuel James Harrison, 260 Hogfaton La., Preston, PR5 OJH, United Kingdom

[21] Appl. No.: 08/913,521
[22] PCT Filed: Mar. 21, 1996
[86] PCT No.: PCT/GB96/00661
§ 371 Date: Sep. 19, 1997
§ 102(e) Date: Sep. 19, 1997
[87] PCT Pub. No.: WO96/28963
PCT Pub. Date: Sep. 26, 1996

[30] Foreign Application Priority Data

Mar. 21, 1995 [GB] United Kingdom .................. 9505628

[51] Int. Cl.$^6$ .................................................. A01G 31/02
[52] U.S. Cl. ................................................................ 47/65.7
[58] Field of Search ............................. 47/65, 65.5, 65.7, 47/65.9, 66.7, 67, 73, 78, 65.8

[56] References Cited

U.S. PATENT DOCUMENTS

| | | | |
|---|---|---|---|
| 3,992,810 | 11/1976 | Kimball | 47/77 |
| 4,068,405 | 1/1978 | Campbell et al. | 47/65 |
| 4,166,341 | 9/1979 | Vestergaard | 47/59 |
| 4,713,909 | 12/1987 | Roper et al. | 47/17 |
| 4,926,586 | 5/1990 | Naganatsu | 47/66 |
| 4,930,253 | 6/1990 | Todd, Sr. | 47/65 |
| 5,042,196 | 8/1991 | Lukawski | 47/65 |
| 5,393,313 | 2/1995 | Reiger | 47/58 |

FOREIGN PATENT DOCUMENTS

| | | |
|---|---|---|
| 0 012 013 | 6/1980 | European Pat. Off. . |
| 0 038 709 | 10/1981 | European Pat. Off. . |
| 2 644 669 | 3/1989 | France . |
| 737660 | 8/1955 | United Kingdom . |
| 1 202 921 | 8/1970 | United Kingdom . |
| 1 416 874 | 12/1975 | United Kingdom . |

*Primary Examiner*—Thomas Price
*Attorney, Agent, or Firm*—Nikaido Marmelstein Murray & Oram, LLP

[57] ABSTRACT

A planting assembly comprises a single sheet of flexible woven fabric material which is formed into a multiplicity of elongate channels which extend parallel to one another. The channels are defined by folding the material back upon itself to form inner walls of the assembly. The assembly is supported by means of compost within the channels and compost which is banked up against the outside of the outer walls. To remove plants from the assembly, outer walls of the assembly can be moved apart in order to unfold the material.

38 Claims, 4 Drawing Sheets

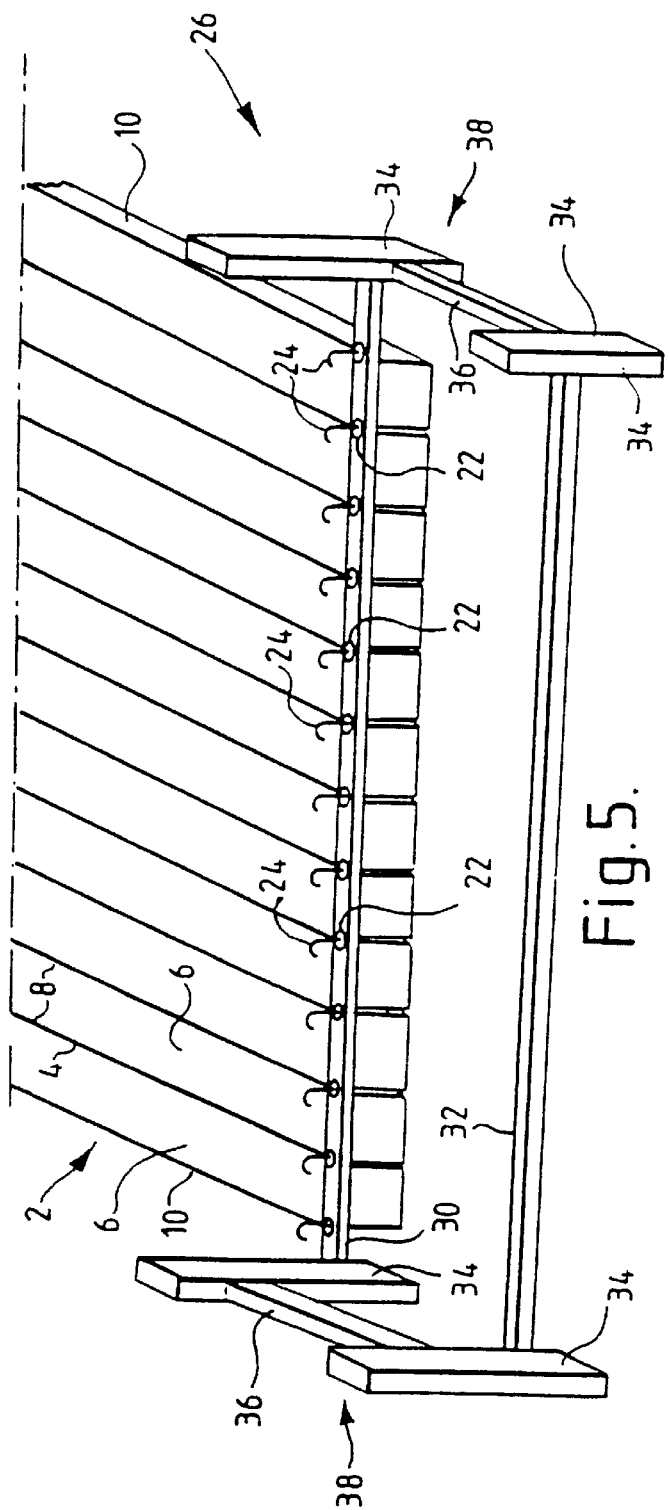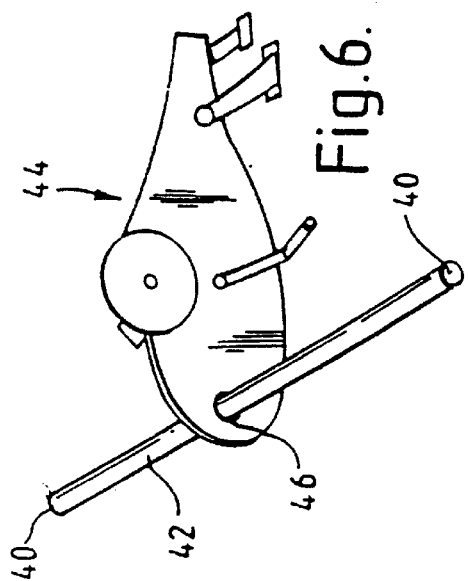

PLANT GROWING

This invention relates to the growing of plants and particularly, although not exclusively, provides a planting assembly for growing plants, a method of assembling a planting assembly, and apparatus for use in the assembly of a planting assembly.

The most widely used apparatus in which plants may be grown is a "plant pot" which is generally a circular cross-section plastics container having holes in its base for passage of water from the pot. Plant pots are filled with compost or soil and seeds or seedlings planted therein.

Commercial growers may use machines to fill pots with soil; however such machines are expensive. There are other problems associated with the use of plant pots by commercial growers. For example, the use of individual plant pots for each plant adds to the costs involved in growing plants; the soil/compost contained in the plant pots tends to hold a relatively large amount of moisture and this adds to the overall weight of the plants which may increase the costs involved in transporting the plants; the plant pots restrict the passage of air through the compost/soil in the pots; and the roots of the plants may be damaged when they are removed from their pots. Furthermore, plant pots are placed side-by-side in a staggered arrangement when plants are being grown. To feed the plants, feed pellets are scattered and/or liquid feed is sprayed over the pots. However, since there are gaps between adjacent pots, up to 20% of the feed may be wasted which again adds to costs. Additionally, it is difficult to clean and/or sterilise plant pots and, consequently, plant pots may not be re-used or, if they are, there is a risk that disease may be spread to seeds and/or seedlings that are planted in unsterilised pots.

It is an object of the present invention to address problems associated with the growing of plants.

According to the invention, there is provided a planting assembly for growing plants, the assembly comprising flexible sheet material arranged to define a plurality of receptacles for growing plants.

Preferably, said receptacles extend parallel to one another. Preferably, each said receptacle has a substantially quadrilateral for example square or rectangular cross-section. Preferably, each said receptacle includes a base wall which is preferably substantially planar and two side walls extending upwardly from the base wall. Said base wall preferably abuts the ground. Preferably, juxtaposed walls of adjacent receptacles make face-to-face contact.

Said sheet material is preferably arranged to define a plurality of walls of said receptacle wherein at least some of said walls are movable between a first configuration in which said receptacle is assembled to a second configuration in which said receptacle is at least partially disassembled. Preferably, each wall of the receptacles is movable as described. By at least partially disassembling said receptacles, plants may be relatively easily removed from the receptacles.

Said plurality of walls preferably extend substantially parallel to one another. Said walls preferably extend upwardly. The majority, preferably each, wall of the receptacles extends upwardly in substantially the same direction. Said wails preferably extend substantially vertically upwardly.

Each said receptacle is preferably in the form of a channel. The or each channel is preferably open at one end, more preferably at opposing ends. The or each channel is preferably upwardly open.

Said sheet material is preferably arranged to allow liquid, for example water to pass therethrough. Said sheet material is preferably arranged to allow a gas, for example air to pass therethrough. Said sheet material is preferably porous and/or non-self-supporting and/or made from a woven material and/or made from a textile material and/or made from a synthetic material for example from a polymeric material which can be drawn into threads. Woven polypropylene material is a preferred sheet material.

Preferably, said plurality of receptacles is formed from a single sheet of material. Said material is preferably folded to define each receptacle. Preferably, juxtaposed walls of adjacent receptacles are formed by folding the sheet material back upon itself so that the planes of the juxtaposed walls are substantially parallel and/or inclined at the same angle.

Wall support means is preferably provided for supporting the walls of said planting assembly. Said wall support means may comprise a growing medium, for example soil or compost, arranged in each receptacle. Outermost walls of said assembly are preferably supported from a position outside the walls, for example using a heavy material, for example stone or soil/compost.

Said planting assembly is preferably elongate. It may have a width of greater than 30 cm, preferably greater than 50 cm, more preferably greater than 1 m. The planting assembly may have a length of greater than 1 m, preferably greater than 2 m and, more preferably greater than 5 m. In some cases, the length of the assembly may be greater than 10 m. The width of the or each receptacle may be at least 2 cm, preferably at least 3 cm. in some cases, the width may be of the order of 30 cm to 40 cm.

The invention also provides a method of assembling a planting assembly, the method comprising forming a flexible sheet material into a plurality of receptacles and maintaining said receptacles in position.

Said method is preferably a method of assembling a planting assembly as described above.

The method preferably includes the step of supporting said sheet material whilst said receptacles are being formed. Preferably, a first support means is used to support a first end of the sheet material. The method preferably includes supporting a second end of the sheet material using a second support means. The method preferably includes the step of applying tension to said sheet material in order to form said receptacles and/or to fix said sheet material relative to said first and/or second support means. Preferably, said receptacles are defined when said first and second ends of the sheet material are supported as described.

Preferably, when said receptacles have been formed, a wall support means is used to support walls of the planting assembly formed. Preferably, said planting assembly is disengaged from said first and/or second support means after it has been supported by said wall support means.

The invention also provides apparatus for use in the assembly of a planting assembly and/or in a method of assembling a planting assembly, the apparatus comprising a flexible sheet material which includes attachment means at opposite sides thereof by means of which said sheet material may be supported.

Said attachment means preferably comprises one or a plurality of openings suitably arranged to be engaged with a support, for example said first and/or second support means referred to in said method described above.

Said apparatus may include first support means for supporting a first end of said sheet material. Said apparatus may include a second support means for supporting a second end of said sheet material. Tension applying means may also be provided for applying tension to said receptacle defining means.

The invention further provides the use of a planting assembly as described herein for growing a product, for example a plant.

The invention further provides the use of apparatus as described herein for the assembly of a planting assembly for growing a product, for example a plant.

The invention also provides a plant when grown using a planting assembly or apparatus as described herein.

Said plant may be arranged in a block of soil which has a quadrilateral-shape, in horizontal cross-section, for example it may be square or rectangular in horizontal cross-section.

The invention extends to a multiplicity of plants as described when in abutting relationship on a support means, for example a pallet for transportation.

Specific embodiments of the invention will now be described, by way of example, with reference to the accompanying diagrammatic drawings, in which:

FIG. 5 is a perspective view of the planting assembly during assembly using a frame device; and FIG. 6 is a perspective view of a winch and winch support rod for use with the frame device of FIG. 5.

Figure 1:
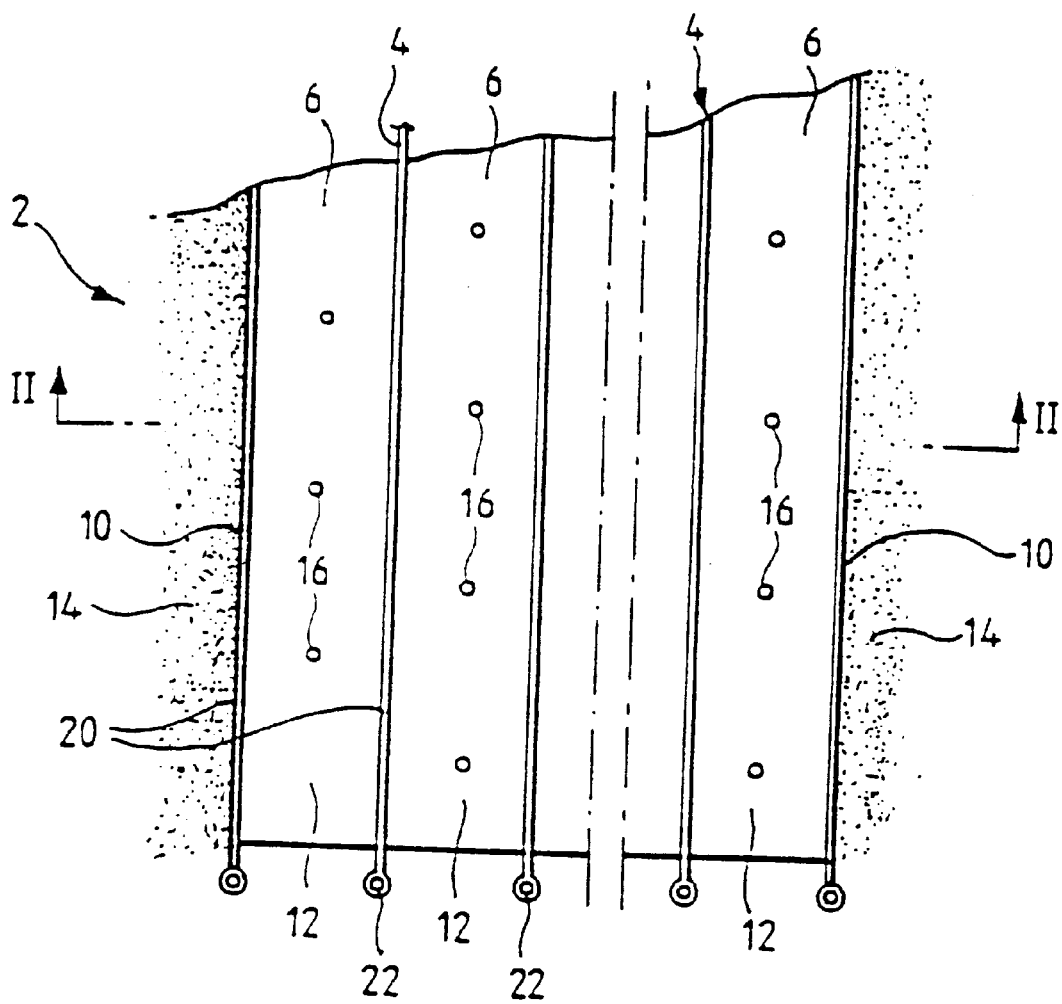
FIG. 1 is a top plan view of a planting assembly in use.
Figure 2:
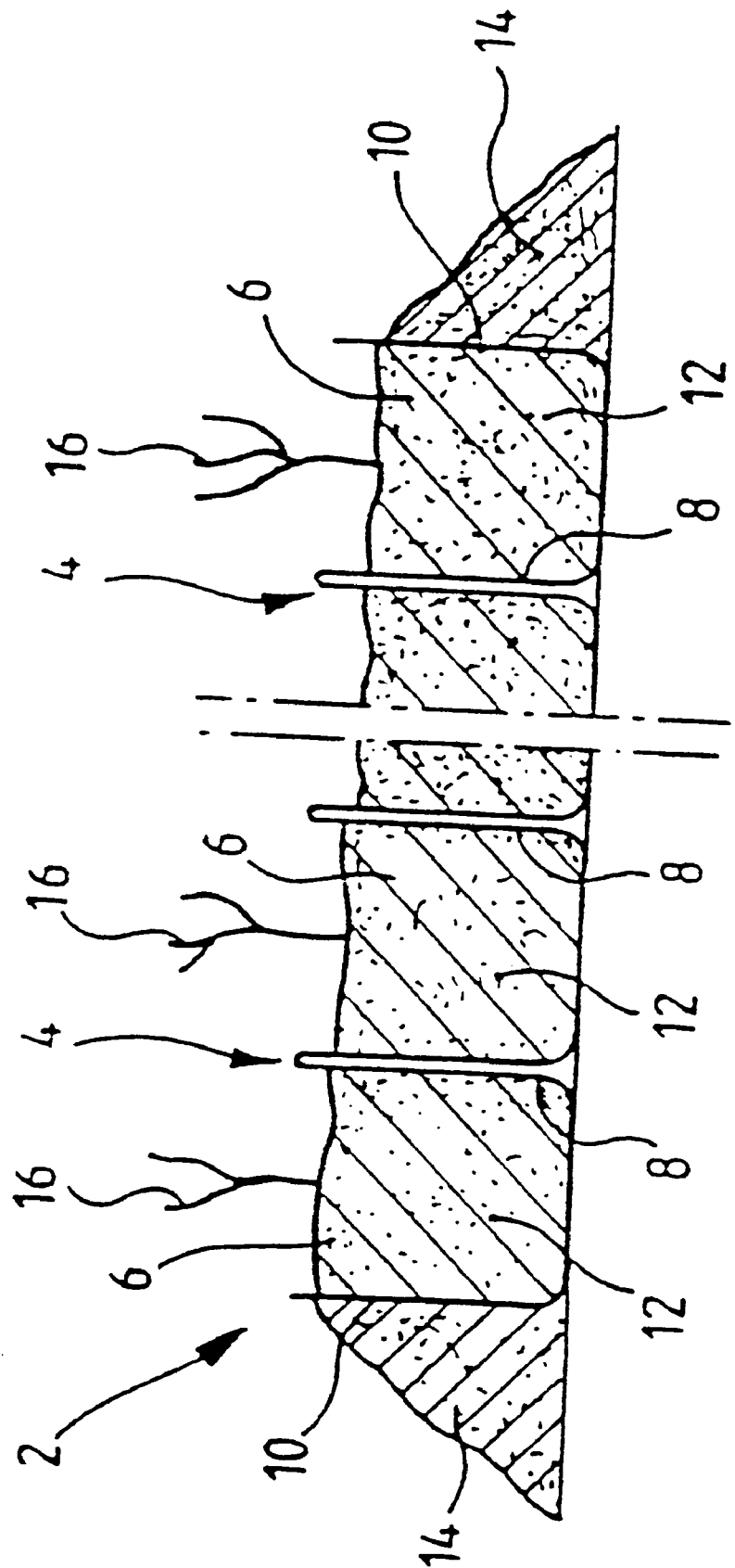
FIG. 2 is a cross-section along line II—II of FIG. 1.

Referring to FIGS. 1 and 2, the planting assembly 2 comprises a single sheet of flexible woven fabric material 4 which is formed into a multiplicity of elongate channels 6 which extend parallel to one another. The channels 6 are defined by folding the material 4 back up on itself to form inner walls 8 of the assembly 2. Thus, inner walls 8 are made up of two layers of fabric material 4. Outer walls 10 of the assembly comprise a single layer of the fabric material.

The channels 6 contain compost 12 (or other growing medium). Compost 14 is banked up against the outside of the outer walls 10. This prevents the outer walls 10 moving outwardly and, therefore, serves to maintain the assembly 2 intact. It should be noted that the compost 12 in the channels 6 effectively serves to support the walls 8 of the channels.

Seedlings 16 are arranged in the compost in the channels 6 so that seedlings in each row are staggered relative to those in an adjacent row, as shown in FIG. 1.

The planting assembly 2 will now be described in greater detail.

The sheet 4 which is used to construct the channels 6 may suitably comprise a polypropylene woven fabric material. This material is flexible, non-self-supporting and porous. Any desired size of sheet maybe used. For commercial applications, the sheet 4 may be of the order of 20 m long and 3 m wide.

Figure 3:
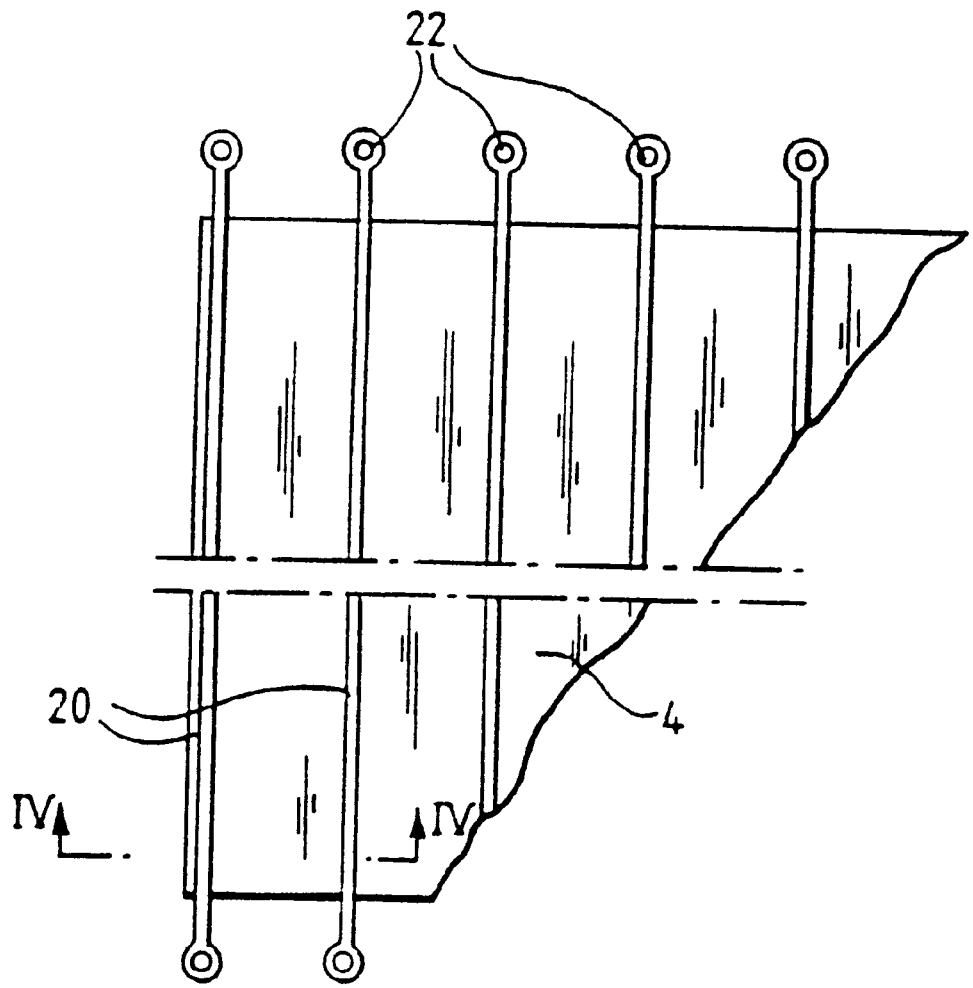
FIG. 3 is a top plan view of a receptacle defining device prior to use.
Figure 4:
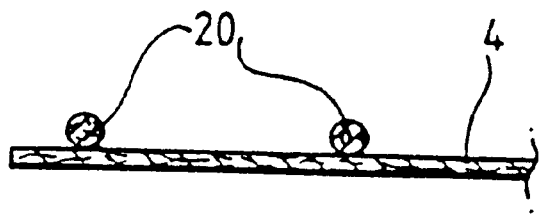
FIG. 4 is cross-section along line IV—IV of FIG. 3.

As shown in FIGS. 3 and 4, lengths of cord 20 are stitched (or otherwise secured) at suitably spaced apart positions to the sheet 4 so that the lengths of cord extend parallel to one another longitudinally of the sheet. At each end, the cords include eyelets 22.

The sheet/cord arrangement of FIG. 3 can readily be formed into the planting assembly of FIGS. 1 and 2. To this end, the eyelets 22 at one end of the sheet are secured to an immovable object, for example, a first framework (not shown) so that the distance between adjacent eyelets is equal to the desired width of the channels 6 to be formed and the distance of the eyelets from the ground is approximately equal to the depth of the channels to be formed. Then, each of the eyelets 22 at the other end of the sheet is engaged with respective spaced apart hooks 24 provided on a second framework 26 (FIG. 5). The second framework 26 is positioned so that when the eyelets 22 are engaged with the hooks 24, the cords 20 are substantially taut between the first and second frameworks.

The second framework 26 includes first and second elongate support struts 30, 32 each of which supports a leg 34 at its ends. Respective transverse struts 36 also support the legs 34. The hooks 24 are attached at spaced apart positions along the first strut 30. The first framework may be similar to the second framework.

Respective winch supports (not shown) are releasably securable to each transversely extending end 38 of the framework 26. The winch supports are arranged to secure respective ends 40 of a rigid winch support rod 42 (FIG. 6) in position so that the support rod 42 is rigidly fixed between ends 38.

A winch 44 is arranged by means of opening 46 to slide along the support rod 42. The winch is provided to enable each of the eyelets 22 to be engaged with hooks 24. To this end, the winch may be positioned opposite each hook 24 in turn and then used to engage the appropriate eyelet 22 with the appropriate hook. As will be appreciated, where the sheet/cord arrangement is relatively long, for example more than 5 m, a significant force will be required to put the cords 20 under tension (and thereby straighten them) and use of the winch enables the required force to be easily applied.

Once the planting assembly has been formed as represented in FIG. 5, the channels 6 thereof are filled with soil. The planting assembly can then be released from its engagement with the first and second frameworks so that it rests upon and is wholly supported by the ground. As the assembly is released, its outer walls 10 are shored up using compost 14 or other suitable means.

It has been found that the channels of the planting assembly are substantially square or rectangular in vertical cross-section when formed in the manner described above.

Seeds or seedlings (or any other desired material) may be planted in the channels 6. The seeds or seedlings are suitably arranged in a staggered configuration as shown in FIG. 1.

It should be appreciated that the seeds/seedlings can be fed and/or watered by scattering food and/or spraying water over the whole of the plan ting assembly and that, since there are no gaps in the assembly, no food/water is wasted. Furthermore, since the channels are made of a porous material (which allows both water and air to pass), the environment in which the seeds/seedlings grow is more akin to the natural growing environment compared to the environment appertaining when seeds/seedlings are grown in conventional plant pots.

Once plants grown in the planting assembly have reached the desired size, they can be removed from the assembly. This is achieved by removing the material (e.g. compost 14) used to shore up outer walls 10 and then moving the outer walls 10 away from one another so that each of the folds in the sheet material is opened out, and the sheet material returned to its original substantially flat state. It is found that the soil is readily detached from the sheeting during this process so that a multiplicity of long lengths of blocks of soil in which plants are arranged remain. It is apparent when the blocks of soil are revealed that roots of the plants tend to grow in the direction of the extent of the channels 6 and it is believed that this is more beneficial to the plants than for the roots to be confined to a small area as in a plant pot.

The long blocks of soil may be cut transversely in order to provide individual plants arranged in a substantially square cross-section block of soil. These may then be arranged on pallets and transported. It will be appreciated that, in view of their shape, they may be packed closely together on pallets, thereby maximising the use of space. Furthermore, since the soil which supports the plants can be arranged to hold less water than that held when plants are grown in conventional pots (without any detriment to the plants) the overall weight of the plants may be less and, therefore, transportation costs may be reduced.

After the plants have been removed from the sheet material, the material may be washed and/or sterilised prior to re-use. Thus, the spread of any disease to plants subsequently grown using the sheet material may be minimised.

The cost of the sheet material may be relatively low compared to the use of an equivalent number of plant pots and, since the sheet material can readily be re-used, the overall costs involved in rearing plants may be further reduced.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A planting assembly for growing plants, the assembly having a plurality of walls which define an elongate receptacle for growing plants, wherein a flexible material is turned back on itself to define an upstanding wall of the receptacle such that said upstanding wall comprises two substantially parallel layers of said flexible material and wherein at least one of said walls of said receptacle is configured to be movable from a first position in which said receptacle is assembled to a second position in which said receptacle is at least partially disassembled.

2. An assembly according to claim 1, wherein said plurality of walls are arranged to define a plurality of receptacles which extend substantially parallel to one another.

3. An assembly according to claim 1, wherein more than one of said walls is configured to be movable from a respective first position to a respective second position.

4. An assembly according to claim 1, wherein said at least one movable wall is configured to be pivotable for movement between said first position and said second position.

5. An assembly according to claim 4, wherein said wall is configured to be pivotable about a fold.

6. An assembly according to claim 1, wherein said plurality of walls extend upwardly.

7. An assembly according to claim 1, wherein the receptacle is in the form of a channel.

8. An assembly according to claim 7, wherein the channel is open at one end.

9. An assembly according to claim 7, wherein the channel is upwardly open.

10. An assembly according to claim 7 wherein said channel is substantially square or rectangular in vertical cross-section.

11. An assembly according to claim 1, wherein at least some of said plurality of walls are arranged to allow liquid to pass therethrough.

12. An assembly according to claim 1, wherein each of said plurality of walls is made from a flexible material.

13. An assembly according to claim 1, wherein at least some of said plurality of walls are made from a woven material.

14. An assembly according to claim 1, wherein said plurality of walls are formed from a single piece of material.

15. An assembly according to claim 14 wherein said material is folded to define the receptacle.

16. An assembly according to claim 14, wherein a plurality of upstanding walls of the assembly are defined by the sheet material being folded back upon itself.

17. An assembly according to claim 16, wherein said plurality of upstanding walls are made up of two layers of the sheet material.

18. An assembly according to claim 14, wherein said material includes attachment means at respective opposite sides by means of which said material may be supported.

19. An assembly according to claim 18, wherein said attachment means includes at least one opening arranged to be engaged with a support.

20. An assembly according to claim 1, wherein said plurality of walls are formed from a flexible non-self-supporting sheet material.

21. An assembly according to claim 1, wherein the receptacle includes a base wall which abuts the ground.

22. An assembly according to claim 1, wherein wall support means is provided for supporting the walls of said planting assembly in their first positions.

23. An assembly according to claim 1, wherein outer walls of said receptacle are supported from a position outside said walls.

24. An assembly according to claim 1, having a width of greater than 30 cm.

25. An assembly according to claim 1, having a width of greater than 50 cm.

26. An assembly according to claim 1, having a width of greater than 1 m.

27. An assembly according to claim 1, having a length of greater than 1 m.

28. An assembly according to claim 1, having a length of greater than 2 m.

29. An assembly according to claim 1, having a length of greater than 5 m.

30. An assembly according to claim 1, wherein the width of the receptacle is at least 2 cm.

31. An assembly according to claim 1, wherein the width of the receptacle is at least 3 cm.

32. An assembly according to claim 1, wherein the assembly includes a plurality of upstanding walls defining a plurality of receptacles, wherein each of said walls is configured to be movable in order to disassemble each receptacle of the assembly.

33. A method of assembling a planting assembly for growing plants, the method comprising forming a receptacle defining means into a receptacle having a plurality of walls, wherein said receptacle defining means comprises a flexible material which is turned back on itself to define an upstanding wall of the receptacle such that said wall comprises two substantially parallel layers of said flexible material, wherein at least some of said walls of said receptacle are configured to be movable from a first position in which said receptacle is assembled to a second position in which said receptacle is at least partially disassembled.

34. A method according to claim 33, further comprising supporting said receptacle defining means while said receptacle is being defined.

35. A method according to claim 33, wherein first support means supports a first end of the receptacle defining means.

36. A method according to claim 35, wherein second support means supports a second end of the receptacle defining means.

37. A method according to claim 33, wherein tension applying means is provided for applying tension to said receptacle defining means.

38. A plant which is grown using a planting assembly according to claim 16.

* * * * *